US005575067A

United States Patent [19]

Custer et al.

[11] Patent Number: 5,575,067

[45] Date of Patent: Nov. 19, 1996

[54] METHOD OF MAKING A CONTINUOUS CERAMIC FIBER REINFORCED HEAT EXCHANGER TUBE

[75] Inventors: Milton F. Custer, Discovery Bay; Becky A. Simpson, Livermore, both of Calif.

[73] Assignee: Hexcel Corporation, Pleasanton, Calif.

[21] Appl. No.: 382,769

[22] Filed: Feb. 2, 1995

[51] Int. Cl.$^6$ ...................................................... B23P 15/26

[52] U.S. Cl. ................................ 29/890.036; 29/890.053

[58] Field of Search ......................... 29/890.03, 890.033, 29/890.034, 890.036, 890.046, 890.053, 445, 455.1, 458, 460, 523; 165/180

[56] References Cited

U.S. PATENT DOCUMENTS

| | | | |
|---|---|---|---|
| 2,703,921 | 3/1955 | Brown, Jr. | 29/890.036 |
| 3,112,184 | 11/1963 | Hollenbach . | |
| 3,251,403 | 5/1966 | Smith . | |
| 3,334,400 | 8/1967 | Jaeger | 29/890.036 |
| 3,339,260 | 9/1967 | Burne et al. | 29/890.036 |
| 3,921,273 | 11/1975 | Kondo et al. | 29/890.06 |
| 3,948,317 | 4/1976 | Moore . | |
| 4,437,217 | 3/1984 | Lallaye et al. . | |
| 4,545,429 | 10/1985 | Place, Jr. et al. . | |
| 4,582,126 | 4/1986 | Corey . | |
| 4,852,645 | 8/1989 | Coulon et al. . | |
| 5,042,565 | 8/1991 | Yuen et al. . | |
| 5,348,213 | 9/1994 | Randlett et al. | 29/890.053 |

*Primary Examiner*—Irene Cuda
*Attorney, Agent, or Firm*—Townsend and Townsend and Crew LLP

[57] ABSTRACT

A ceramic heat exchanger tube (1) includes a hollow ceramic outer tube (2) with a corrugated ceramic fiber inner member (8) housed within and secured to the outer tube defining one or more fluid passageways (14) therebetween. The corrugated inner member helps to keep the outer tube from failing catastrophically by momentarily slowing down the initial outwardly expanding movement of the pieces of the failed outer tube. This keeps the pieces of the failed outer tube from being blown outwardly in a shrapnel-like manner to prevent damage to adjoining tubes.

18 Claims, 2 Drawing Sheets

METHOD OF MAKING A CONTINUOUS CERAMIC FIBER REINFORCED HEAT EXCHANGER TUBE

BACKGROUND OF THE INVENTION

Conventional coal or gas fired heat exchanger units are well known for generating electricity using turbines. These heat exchanger units often use monolithic ceramic tubes as conduits for the air to be heated in the combustion chamber. As many as three thousand tubes per heat exchanger unit may be used.

Typically, the air running through a turbine is pressurized to 15–20 psi through the heat exchanger tubes and then subsequently highly pressurized to drive the turbine. Although it is less expensive and more efficient to maintain a constant high pressure (e.g., 200 psi) throughout the unit, the inadequacies of monolithic tubes make it impossible to do so.

A common problem associated with monolithic ceramic tubes is catastrophic failure of the tubes due to original flaws or flaws developed during use or by damage from an external source. Typically, a flawed tube subjected to high internal pressure (e.g., 200 psi), blows up or explodes when it fails, creating a shrapnel effect. In many applications, multiple tubes are in close proximity to each other. In the event of failure of one tube, the pieces of the broken tube become projectiles and destroy adjacent tubes. This creates a cascading effect and ultimately results in the destruction of many or all of the tubes in a heat exchanger.

Prior attempts to avoid the catastrophic breakage problems associated with monolithic ceramic tubes include utilization of a ceramic impregnated woven substrate as either an outside wrap or an inner sleeve to constrain pieces of the failed tube sufficiently to prevent damage to the adjacent tubes. The method has several limitations. First, current ceramic fabrics will withstand only about 1,800 degrees Fahrenheit ("F") for any length of time. This is problematic in applications that routinely require temperatures in excess of 1800 degrees F. Second, the methodology requires a flexible ceramic pre-impregnated fabric. The silica component of a ceramic composite may be fluxed by the impurities of coal gas. Consequently, use of the method in a coal fired heat exchanger unit is prohibitive. Third, the inability to match the coefficient of thermal expansion of the currently available commercial exchanger to that of a ceramic system which can be impregnated and subsequently fired causes debonding and cracking of the materials.

Other attempts to avoid the catastrophic breakage problems associated with monolithic ceramic tubes include use of metal tubes rather than ceramic ones. Two primary disadvantages of metal tubes are their temperature limitations and their corrosion limitations. In addition, metal tubes are usually quite heavy and often suffer from fatigue failure. Metals which are more resistant to high temperatures and corrosion are often too expensive to use.

SUMMARY OF THE INVENTION

The present invention is directed to a continuous ceramic fiber reinforced ("CCFR") heat exchanger tube that avoids the catastrophic breakage problems associated with currently available ceramic heat exchanger, and is more cost effective than metal heat exchanger. This invention stems from the realization that if a ceramic tube fails, it should fail in a non-catastrophic manner. Key to this realization is the recognition of two previously unrecognized principles.

First, by delaying the initial movement of the pieces of the newly fractured ceramic tube by a small fraction of time, the crack or fissure can expand sufficiently to permit the release of pressurized fluid through the crack or fissure. This slows down the movement of the pieces of the ceramic tube sufficiently to create at most harmless debris, rather than a catastrophic shrapnel effect. By holding the tube together long enough to allow the fissure to expand sufficiently, catastrophic breakage is avoided.

Second, commercially available ceramic tubes used with heat exchangers are long, typically 6 to 16 feet in length, and are neither perfectly straight nor perfectly smooth. Consequently, insertion of a solid strengthening structure into the ceramic tube, although a typical engineering solution, will not solve the catastrophic breakage problems associated with ceramic tubes. Due to the irregularities in a ceramic tube, a solid structure inserted into the tube will not fit snugly against the inner surface of the tube, and hence cannot be bonded with sufficient contact to the tube to hold it together for the time necessary to allow the fissure to expand and thereby avoid a catastrophic result.

In the present invention, the heat exchanger tube is made by first selecting a hollow ceramic outer tube having inner and outer surfaces. Preferably, the tube is comprised of an effectively air-impermeable monolithic ceramic material, thus providing the advantages of monolithic ceramic heat exchanger tubes, including strength, low friction, good wear resistance and low cost. Next, a corrugated ceramic fiber inner member having a plurality of hinge joints and a plurality of outer contact surfaces is constructed. The outer contact surfaces of the inner member are then positioned against the inner surface of the outer tube through the flexion of the hinge joints. Finally, the outer contact surfaces of the inner member are affixed to the inner surface of the outer tube. The result is a heat exchanger tube having at least one fluid flow passageway between the outer tube and the inner member. In the event of tube failure, the corrugated ceramic fiber inner member provides the structure to temporarily slow down the radially outward movement of pieces of the ceramic tube to prevent the catastrophic shrapnel effect.

The present invention is also directed to the resulting heat exchanger tube, which is comprised of a hollow ceramic outer tube with a longitudinal axis, an inner surface and an outer surface, and at least one corrugated ceramic fiber inner member. The inner member is housed within the outer tube and has a plurality of axially-extending outer contact surfaces which are affixed to the inner surface of the outer tube with at least one axially-extending fluid passageway defined between the outer tube and the inner member.

Other features and advantages of the invention will appear from the following description in which the preferred embodiments have been set forth in detail in conjunction with the accompanying drawing.

DESCRIPTION OF THE PREFERRED EMBODIMENT

Figure 1:
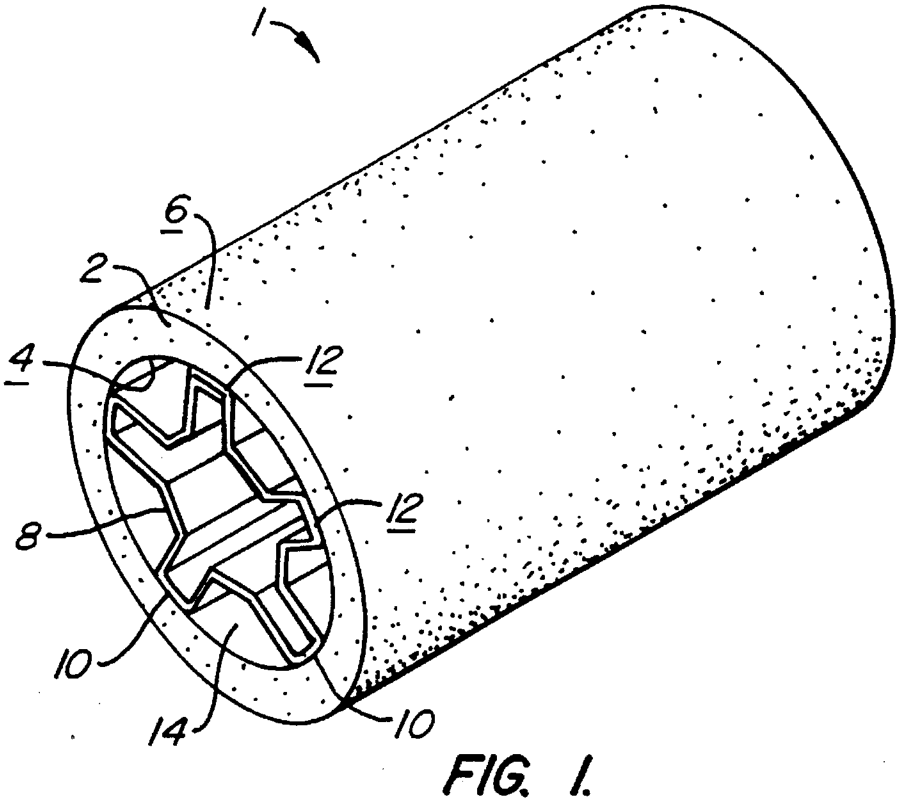
FIG. 1 is a simplified isometric cross-sectional view of a heat exchanger tube made according to the invention.

The present invention is directed toward a method of making a continuous ceramic fiber reinforced ("CCFR") heat exchanger tube that avoids the catastrophic breakage problems associated with currently available ceramic heat exchanger, and is more cost effective than metal heat exchanger. FIG. 1 illustrates one embodiment of a heat exchanger tube 1 made according to the invention.

Heat exchanger tube 1 is made by selecting a hollow ceramic outer tube 2 having an inner surface 4 and outer surface 6. Preferably, outer tube 2 is comprised of an effectively air-impermeable monolithic ceramic material such as mullite, silicon carbide, or alumina, by way of example. Outer tube 2 can be made by slip casting or other techniques. One such tube is made by the Carborundum Company of Niagara Falls, N.Y.

A corrugated ceramic fiber inner member 8 having a plurality of hinge joints 10 and a plurality of outer contact surfaces 12 is then constructed. The constructing step is preferably carried out by first selecting a ceramic fiber material 16, which typically includes silicon carbide, silicon nitride, alumina, mullite, silica, quartz, single crystal ceramics or a combination of them. Preferably, ceramic fiber material 16 includes woven fibers, which are oriented parallel to the axis, and hoop fibers, which are oriented in a circumferential direction relative to the axis.

Figure 2:
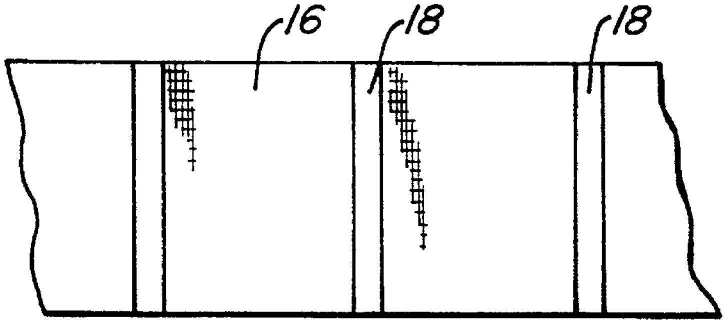
FIG. 2 is a simplified top view of ceramic fiber material, having a non-wetting, sacrificial substance at selected hinge positions.

Once ceramic fiber material 16 has been selected, a non-wetting, sacrificial substance 18 is applied to ceramic fiber material 16 at selected hinge positions, as shown in FIG. 2. Sacrificial substance 18 may be any substance which effectively prevents another substance, such as ceramic slurry, from permeating ceramic fiber material 16 to which it is applied. One example of such a non-wetting, sacrificial substance is melted wax.

Figure 3:
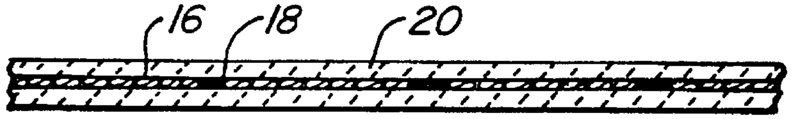
FIG. 3 is a simplified cross-sectional view of ceramic fiber material of FIG. 2 after being impregnated with a ceramic slurry.

As shown in FIG. 3, ceramic fiber material 16 is then impregnated with a ceramic slurry 20. Ceramic slurry 20 typically includes a ceramic material, a carrier medium and a binder. Preferably, the ceramic material includes fine grains of either ceramic particles, such as alumina, mullite, lithium aluminum silicate, calcium aluminum silicate, silica, silicon carbide, silicon nitride or a combination of them, or ceramic precursors. The carrier medium is typically a solvent such as ketone, and the binder is preferably an acrylic binder, for example, methylmethacrylate and a catalyst.

Figure 4:
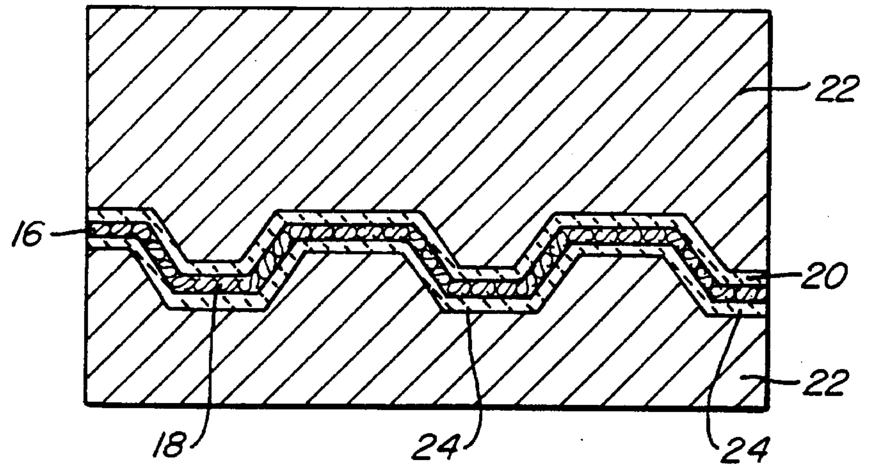
FIG. 4 is a simplified cross-sectional view of a device used to corrugate a ceramic fiber inner member in one embodiment of the present invention.

Next, ceramic fiber material 16 is corrugated and heated in a mold 22 to form the cured corrugated inner member 8. Heating to about 350 degrees F causes the binder to harden so inner member 8 retains its corrugated shape once removed from mold 22. As used herein, the term "corrugated" refers to a repeating pattern of selected ridges or bends in the ceramic fiber material 16 which create a series of "hills" and "valleys" in the material. As illustrated in FIG. 4, one way of corrugating ceramic fiber material 16 is to place it in a mold 22, such as a matched metal contoured mold, having male mold radii 24. Although FIG. 4 illustrates placement of the hinge positions bearing sacrificial substance 18 at male mold radii 24, and thus at hinge joints 10, other placements may be used. The shape of the male mold radii will determine the shape of the corrugation pattern. Although FIG. 4 illustrates use of mold 22 with half-hexagonal male mold radii 24 to corrugate ceramic fiber 16, a mold with male mold radii of virtually any shape can be used. After the corrugated material is cured at about 350° F. for 1 hour to rigidize the shape, it is then sintered at 1600° F. for approximately 8 hours. This produces a maximum rigidized part and removes the sacrificial substance leaving unimpregnated substrate in that area which become the hinge joints.

Figure 5:
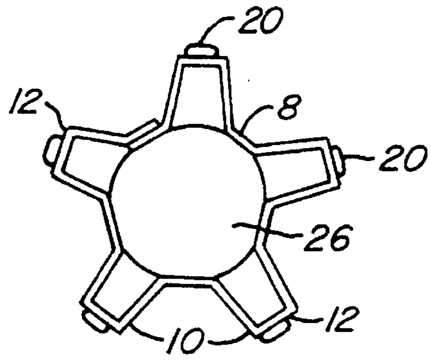
FIG. 5 is a simplified end view of a corrugated ceramic fiber inner member wrapped around an inflatable device and impregnated with a ceramic slurry at the hinge joints.

Outer contact surfaces 12 are then positioned against inner surface 4 of outer tube 2 by flexion of hinge joints 10. Preferably, the positioning step is carried out by first flexing hinge joints 10 and wrapping inner member 8 around an inflatable member 26, such as an inflatable mandrel. Outer contact surfaces 12 are then impregnated with an adherable material, such as ceramic slurry 20 described above. Outer contact surfaces 12 impregnated with ceramic slurry 20 are flexible and preferably somewhat tacky to help them adhere to inner surface 4 of outer tube 2. FIG. 5 illustrates impregnated inner member 8 wrapped around inflatable, but deflated, member 26.

Figure 6:
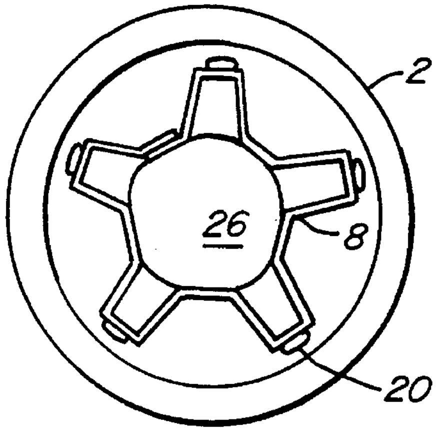
FIG. 6 is a simplified end view of the wrapped inner member assembly of FIG. 5 inserted into a ceramic outer tube.
Figure 7:
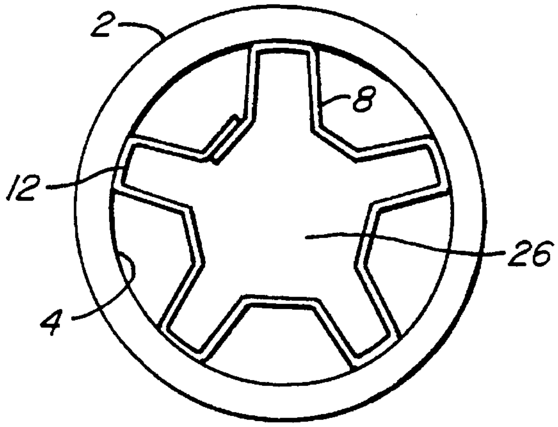
FIG. 7 is a simplified end view of the wrapped inner member assembly of FIG. 6, in which the inflatable device is expanded.

The wrapped inflatable member assembly is then inserted into outer tube 2. FIG. 6 illustrates a cross-sectional view of outer tube 2 housing wrapped inflatable member 26. Once inserted, inflatable member 26 is expanded until outer contact surfaces 12 of inner member 8 abut inner surface 4 of outer tube 2, as illustrated in FIG. 7. Once positioned, it is preferable to deflate inflatable member 26 and remove it from inside inner member 8. The tackiness of the ceramic slurry keeps outer contact surfaces 12 in contact with inner surface 4. On the other hand, using an inflatable member of a heat resistant material will permit leaving the inflatable member in place during cure at 325° F.

Outer contact surfaces 12 of inner member 8 are then affixed to outer tube 2 and cured at 325° F. The final affixing step is carried out by sintering, for example, by placing outer tube 2 housing inner member 8 in an oven at about 1600 degrees F for approximately 8 hours. The result is heat exchanger tube 1 of FIG. 1, with at least one fluid flow passageway 14 between outer tube 2 and inner member 8. Outer tube 2 may be 8 feet or more in length, and it is possible to position and affix a plurality of corrugated inner members 8 throughout the entire length of outer tube 2.

The present invention is also directed toward a heat exchanger tube 1, which is preferably made according to the above method. FIG. 1 illustrates one such heat exchanger tube. As illustrated in FIG. 1, heat exchanger tube 1 has a hollow ceramic outer tube 2 with a longitudinal axis, an inner surface 4 and outer surface 6. Preferably outer tube 2 is made of a monolithic ceramic material. Housed within outer tube 2 is a ceramic fiber inner member 8 with a plurality of axially-extending outer contact surfaces 12. Outer contact surface 12 are affixed to inner surface 4 such that at least one axially-extending fluid passageway 14 is defined between outer tube 2 and inner member 8. Typically, inner member 8 includes components such as silicon carbide, silicon nitride, alumina, mullite, silica, quartz, single crystal ceramics or a combination them. Preferably, inner member 8 also include woven fibers, which may include axial fibers, oriented parallel to the axis, and hoop fibers, oriented circumferentially relative to the axis. In one embodiment of the invention, inner member 8 is a corrugated tube where outer tube 2 and inner member 8 define a plurality of fluid passageways. In another embodiment, the internal area left after exclusion of the mandrel of the final heat exchanger tube is sealed off at each, thus forcing all flow through the tube in the passageway between outer tube 2 and inner member 8.

Further modifications and variations can be made to the disclosed embodiments without departing from the subject matter of the invention as defined in the following claims.

What is claimed is:

1. A method for making a hollow, ceramic heat exchanger tube comprising the following steps:

selecting a hollow ceramic outer tube having inner and outer surfaces;

constructing a corrugated ceramic fiber inner member having a plurality of hinge joints and a plurality of outer contact surfaces;

positioning said outer contact surfaces against said inner surface of said outer tube through the flexion of said hinge joints; and affixing said outer contact surfaces to said inner surface of said outer tube to form a heat exchanger tube having at least one fluid flow passageway between said outer tube and said inner member.

2. The method of claim 1 wherein the selecting step is carried out by selecting a tube comprised of an effectively air-impermeable monolithic ceramic material.

3. The method of claim 1 wherein the constructing step is carried out by:

selecting a ceramic fiber material;

applying a sacrificial substance to the ceramic fiber material at selected hinge positions;

impregnating the ceramic fiber material with a slurry of ceramic material, carrier medium and binder;

corrugating said ceramic fiber material; and curing the corrugated, impregnated material by solidifying said binder to form said inner member with said hinge joints at said selected hinge positions.

4. The method of claim 3 wherein said ceramic fiber material includes woven fibers.

5. The method of claim 4 wherein the woven fibers include axial fibers oriented parallel to the axis and hoop fibers oriented in a circumferential direction relative to the axis.

6. The method of claim 3 wherein the ceramic fiber material includes one or more of the following: silicon carbide, silicon nitride, alumina, mullite, silica, quartz and single crystal ceramics.

7. The method of claim 3 wherein the ceramic material is chosen from one or more of the following: alumina, mullite, lithium aluminum silicate, calcium aluminum silicate, silica, silicon carbide, silicon nitride and glass.

8. The method of claim 3 wherein the ceramic material is a ceramic precursor material.

9. The method of claim 3 wherein the binder is an acrylic binder.

10. The method of claim 3 wherein the impregnating step occurs before the corrugating step.

11. The method of claim 1 wherein the positioning step is carried out by:

wrapping the inner member circumferentially around an inflatable member;

impregnating the outer contact surfaces with an adherable material;

inserting the wrapped inflatable member into the outer tube; and expanding the inflatable member until the outer contact surfaces abut the inner surface of the outer tube.

12. The method of claim 11 wherein the outer contact surfaces impregnating step is carried out using a ceramic slurry as the adherable material.

13. The method of claim 12 wherein the ceramic slurry includes a ceramic material chosen from one or more of the following: alumina, mullite, lithium aluminum silicate, calcium aluminum silicate, silica, silicon carbide, silicon nitride and glass.

14. The method of claim 12 wherein the ceramic slurry includes a ceramic precursor material.

15. The method of claim 12 wherein the affixing step is carried out by sintering.

16. The method of claim 11 wherein the inflatable member is an inflatable mandrel.

17. The method of claim 1 wherein the affixing step is carried out by pyrolysis.

18. The method of claim 1 wherein the outer contact surfaces are positioned at the hinge joints.

* * * * *